(12) United States Patent
Tolly

(10) Patent No.: US 6,457,727 B1
(45) Date of Patent: Oct. 1, 2002

(54) HAND TRUCK AND KIT THEREOF

(76) Inventor: Randal Lee Tolly, 843 Hedwick St., New Carlisle, OH (US) 45344

( * ) Notice: Subject to any disclaimer, the term of this patent is extended or adjusted under 35 U.S.C. 154(b) by 0 days.

(21) Appl. No.: 09/532,752

(22) Filed: Mar. 22, 2000

(51) Int. Cl.[7] .................................................. B62B 1/12
(52) U.S. Cl. ............................... 280/47.28; 280/47.19; 414/490; 414/446
(58) Field of Search ................................ 414/490, 446; 280/47.19, 47.28, 47.35, 47.131, 47.18, 47.29; 211/90.01, 187; 187/234, 236, 270, 272, 273

(56) References Cited

U.S. PATENT DOCUMENTS

| | | |
|---|---|---|
| 795,147 A | 7/1905 | Magoffin |
| 2,514,825 A | 7/1950 | Zenko |
| 2,598,489 A | 5/1952 | Bayer et al. |
| 2,653,679 A * | 9/1953 | Hamilton, Jr. ............... 414/290 |
| 2,934,211 A * | 4/1960 | Shivek ........................ 414/290 |
| 3,003,654 A | 10/1961 | Pelto |
| 3,052,323 A * | 9/1962 | Hopfeld ...................... 414/290 |
| 3,072,219 A * | 1/1963 | Olson ......................... 414/290 |
| 3,578,353 A | 5/1971 | Lockhart |
| 3,704,799 A * | 12/1972 | Morris, Jr. .................. 414/290 |
| 3,763,965 A | 10/1973 | Riekkinen |
| 3,907,138 A | 9/1975 | Rhodes |
| 4,258,826 A * | 3/1981 | Murray ....................... 414/290 |
| 4,421,209 A * | 12/1983 | Vermett et al. ............. 414/290 |
| 4,737,065 A * | 4/1988 | Ju .............................. 414/490 |
| 4,921,388 A * | 5/1990 | Nelson ....................... 414/490 |
| 5,251,922 A | 10/1993 | Mann |
| 5,489,183 A | 2/1996 | Malden et al. |
| 5,575,605 A | 11/1996 | Fisher |
| 5,647,720 A | 7/1997 | Golicz et al. |
| 5,738,480 A * | 4/1998 | Butzen ....................... 414/490 |
| 5,885,047 A * | 3/1999 | Davis et al. ................ 414/490 |
| 6,062,802 A * | 5/2000 | Aenchbacher .............. 414/490 |
| 6,138,584 A * | 10/2000 | Waite ......................... 211/187 |

* cited by examiner

Primary Examiner—Brian L. Johnson
Assistant Examiner—Jeffrey Restifo
(74) Attorney, Agent, or Firm—Killworth, Gottman, Hagan & Schaeff, LLP

(57) ABSTRACT

A hand truck includes an automatic height adjusting load platform, or alternatively, a kit of components provides for adding an adjustable load platform to an existing hand truck. The load platform position is held in a raised position while under no load conditions. A user places an article including a package on the raised platform, which is configured to rest at approximately waist level. In response to the weight of the article, the platform lowers, but the downward motion of the platform is inhibited by a platform arrestor. Preferably, the platform arrestor is configured such that the distance the platform will drop due to the weight of the load is proportional to the height of the article placed upon the platform. Thus the top of the article first placed upon the load platform is now substantially at waist level. This process can continue until the platform is lowered to the bottom of the shaft that the platform is slidably mounted to. Further, as articles are removed, under normal conditions, or where the load becomes unstable due to tipping or the like, the platform arrestor will control the rate at which the platform returns to its raised position. The load platform is further detachable for applications where having the platform in a raised position is undesirable.

20 Claims, 5 Drawing Sheets

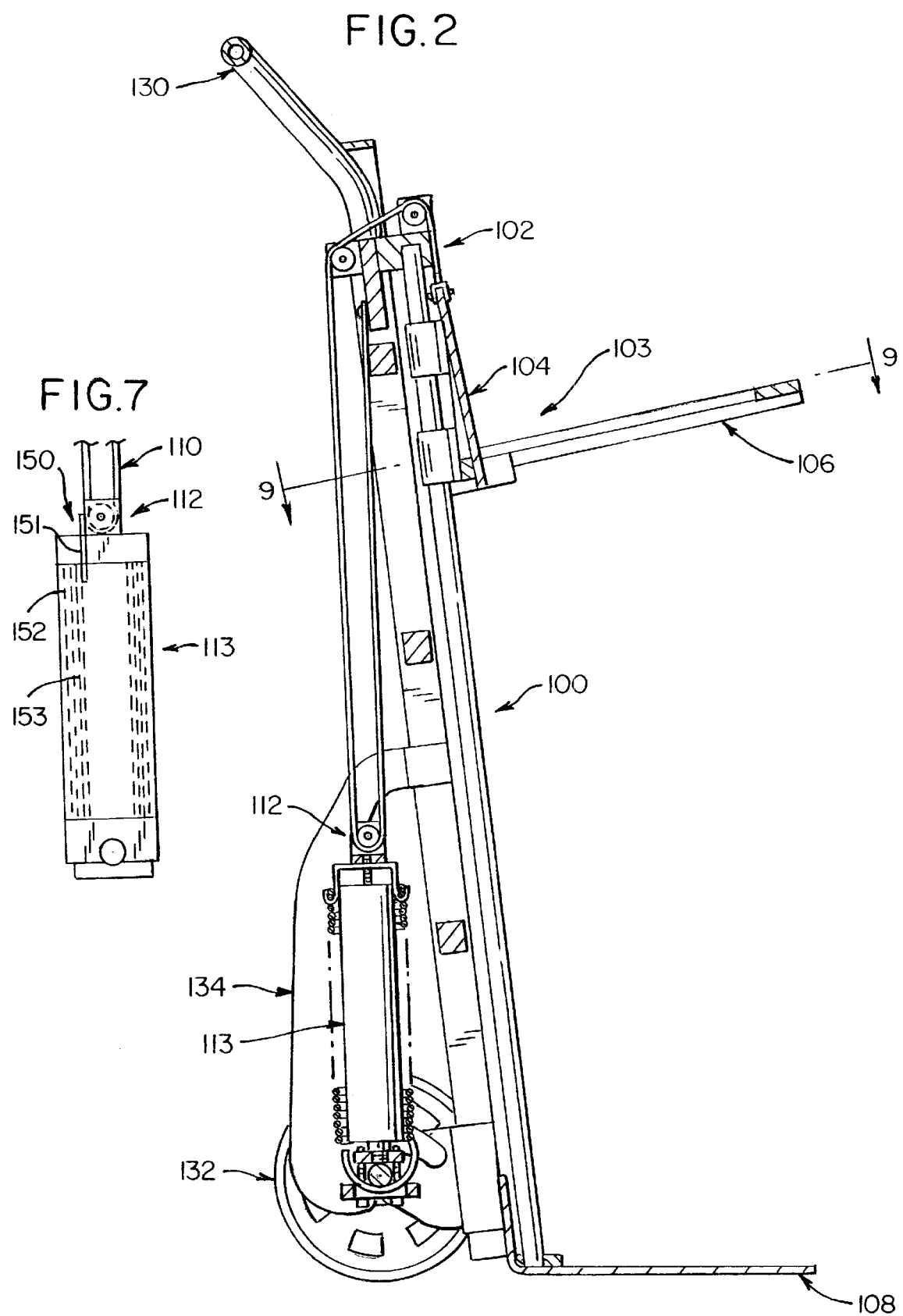

HAND TRUCK AND KIT THEREOF

BACKGROUND OF THE INVENTION

1. Technical Field of the Invention

The present invention relates in general to hand truck, and more particularly to a hand truck with an automatic height adjusting load platform and a kit for modifying a hand truck to include an automatic height adjusting load platform.

2. Description of the Related Art

Hand trucks and other hand operated material moving devices have been widely used for numerous years. A hand truck is usually comprised of a substantially vertical frame, a load platform or shelf secured to the bottom portion of the frame that extends outward and perpendicular to the frame, and wheels generally placed near the load platform and on the opposite side of the frame as the load platform. A user slides the load platform under an object to be moved, or alternatively sets an object upon the load platform, then rotates the vertical frame such that the load platform is raised into the air and only the wheels contact the surface immediately below the hand truck. By balancing the hand truck on its wheels, an operator can easily move an otherwise heavy object from one position to another.

While the hand truck enjoys popular success today, it has been recognized by the present inventor that a user must bend or stoop to place objects or remove objects from the load platform. The bending or stooping motion can be eliminated or reduced with an automatic mechanism incorporated into the hand truck such that the height of the load platform automatically adjusts with reference to; the weight and height of the material loaded thereupon. The present inventor has further recognized that a load placed on a hand truck can be of significant weight. Should a load become unstable either due to tipping or the like, a sudden reduction in weight on the load platform could cause the platform to raise too quickly.

The present inventor has additionally recognized that an adjustable shelf in a raised position may be awkward for certain transportation needs. For example, it is not uncommon to secure hand trucks to the exterior of a vehicle by wedging the load platform into a predetermined position. This is difficult or impossible to accomplish with a raised platform.

Accordingly, there is a need for a hand truck with an automatic height adjusting load platform that incorporates a braking mechanism to prevent the load platform from transitioning too quickly due to sudden changes in load. Preferably, the load platform should be removable and repositionable. Further, the adjustable load platform should optionally be in kit form for retrofitting currently existing hand trucks.

SUMMARY OF THE INVENTION

This need is met by the present invention wherein a hand truck includes a automatic height adjusting load platform. A shelf guide secured between the frame upper and lower portions provides a substantially vertical shaft positioned between the vertical frame members of the hand truck. The load platform is slidably mounted to the shaft and interconnected to a platform arrestor for controlling the variable shelf position. The load platform position is held in a raised position while under no load conditions by the platform arrestor. For example, one of many possible options is to configure the load platform to rest at approximately waist level. A user places an article such as a package or carton on the raised platform. In response to the weight of the article, the platform lowers, but the downward motion of the platform is inhibited by the platform arrestor. Preferably, the platform arrestor is configured such that the distance the platform will drop due to the weight of the load is proportional to the height of the article placed upon the platform. Of course this presupposes that the hand truck will be used to haul items of consistent dimension and weight, but in industries such as beverage distribution, this is often the case. Thus the top of the article first placed upon the load platform is now substantially at the unloaded, load platform level. This process can continue until the platform is lowered to the bottom of the shaft that the platform is slidably mounted to. If the load platform was initially at waist level, and the proper size and weight items were being loaded, the user is never required to bend or stoop. As, articles are removed, under normal conditions, the platform arrestor will control the rate at which the platform returns to its raised position. Further, where the load becomes unstable due to tipping or the like, the platform arrestor prevents the load platform from transitioning upward too quickly. The load platform is further detachable for applications where having the platform in a raised position is undesirable.

In accordance with one aspect of the present invention, a hand truck having a substantially vertical frame of spaced parallel bars includes a toe platform extending substantially outward from the frame, and wheels connected to the frame lower portion opposite the toe platform. A shelf guide is secured to the frame to provide a shaft. A load platform slidably mounts to the shaft to provide a surface for placing articles. A platform arrestor is secured to the frame lower portion, for example along the shaft axle, and provides a control to adjust the position of the adjustable load platform. The platform arrestor is connect further, to a pulley assembly at its upper portion. A cable connected between the load platform and the shelf guide upper portion extends over the shelf guide upper portion, downward and through the pulley, and upward to the shelf guide upper portion where it is secured. At least one pulley is further included on the shelf guide upper portion to guide the cable.

The shelf guide of the hand truck includes top mounting bracket secured to the frame between the spaced parallel bars and includes at least one bracket pulley. The shelf guide lower portion is secured to the frame lower portion, for example, by a bracket mounted to the toe plate. A substantially vertical shaft is secured between the shelf guide upper portion via the top mounting bracket, and the shelf guide lower portion for engagement with the slidable load platform. It is preferable that the hand truck includes a pair of stabilizing bars placed one on either side of the shaft to aid in the alignment of larger sized loads. The load platform further includes a shelf plate slidably mounted to the shelf guide and a platform releasably secured to the shelf plate.

Preferably, the platform arrestor includes one or more springs connected between the frame lower portion and the first pulley, and additionally, one or more spring brakes connected between the frame lower portion and the first pulley. The springs may be optionally releasably connected so as to be able to adjust for various loading conditions. The brake can comprise a hydraulic cylinder for example positioned inside the spring.

In accordance with another aspect of the present invention, a kit of components is provided for adding an adjustable load platform to a host hand truck. The host hand truck has in its original configuration, a substantially vertical frame having spaced parallel bars, a frame upper portion and a frame lower portion. The frame lower portion includes a toe platform extending substantially outward from the frame and one or more wheels connected to said frame lower portion opposite said toe platform. The kit of components comprises a shelf guide having a shelf guide upper portion and a shelf guide lower portion. The shelf guide upper portion is secured to the frame upper portion of the host hand truck, while the shelf guide lower portion is secured to the frame lower portion of the host hand truck. Further, a load platform is slidably mounted to the shelf guide. A platform arrestor having a platform arrestor first end and a platform arrestor second end is included for controlling the shelf height. The platform arrestor is connected to the host hand truck frame lower portion. A first pulley is connected to the platform arrestor first end. To attach the load platform to the platform arrestor on the host hand truck, a cable is connected between the load platform and the shelf guide upper portion. The cable extends over the shelf guide upper portion, downward and through the first pulley which is connected to the upper portion of the platform arrestor, and upward terminating by attachment to the shelf guide upper portion. The kit further includes a pair of stabilizing bars connected between the frame upper portion and the frame lower portion for balancing loads held in a raised position.

It is an object of the present invention to provide a hand truck having a height adjustable load platform that is initially in a raised position, and automatically adjusts to the weight of the objects placed upon it.

It is another object of the present invention to provide a hand truck that includes a braking device to prevent sudden oscillations or velocity changes in the load platform due to sudden changes in loading.

It is yet another object of the present invention to provide a hand truck that allows the height adjustable load platform to be repositionable or removable.

It is yet another object of the present invention to provide a hand truck kit that allows a height adjustable load platform to be retrofitted to conventional hand trucks.

Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which:

FIG. 2 is an illustration of a side view of the hand truck with the platform in a raised position;

FIG. 7 is an illustration of a typical platform arrestor;

DETAILED DESCRIPTION OF THE INVENTION

The Hand Truck

Figure 4:
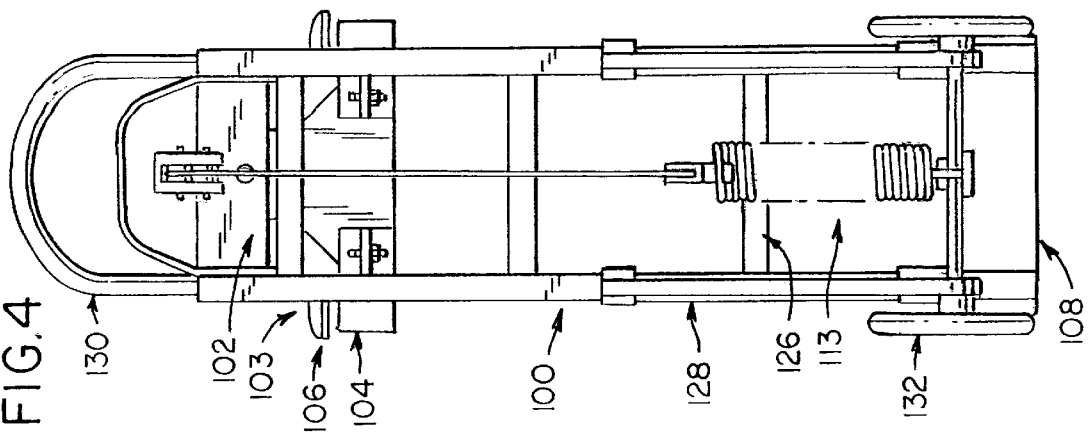
FIG. 4 is an illustration of a rear view of the hand truck with the platform in a raised position.
Figure 3:
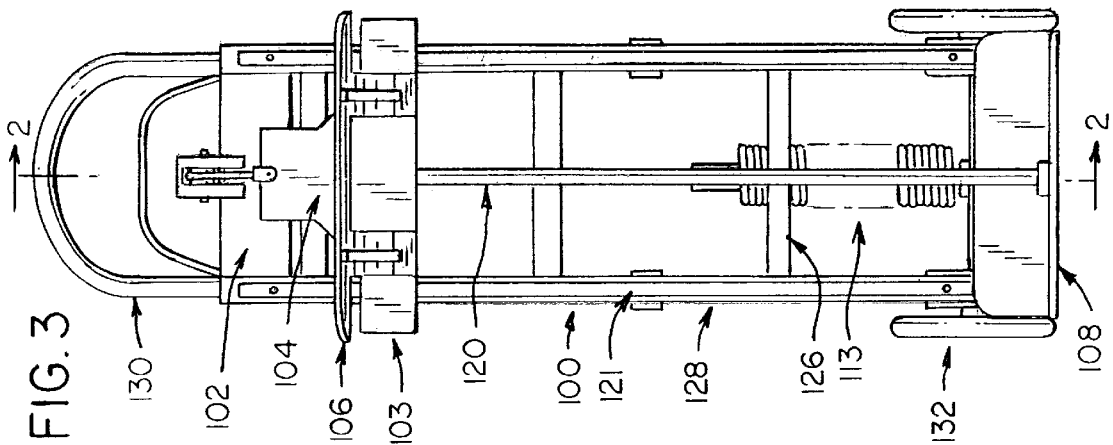
FIG. 3 is an illustration of a front view of the hand truck with the platform in a raised position.
Figure 6:
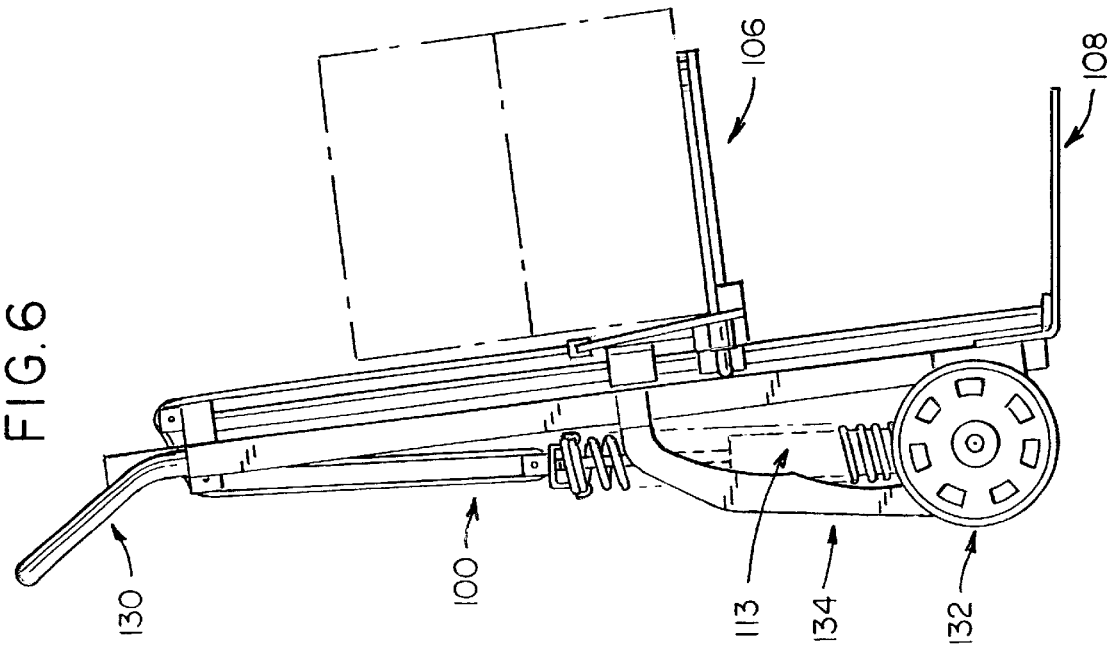
FIG. 6 is an illustration of a side view of the hand truck with the platform loaded with a second item.
Figure 5:
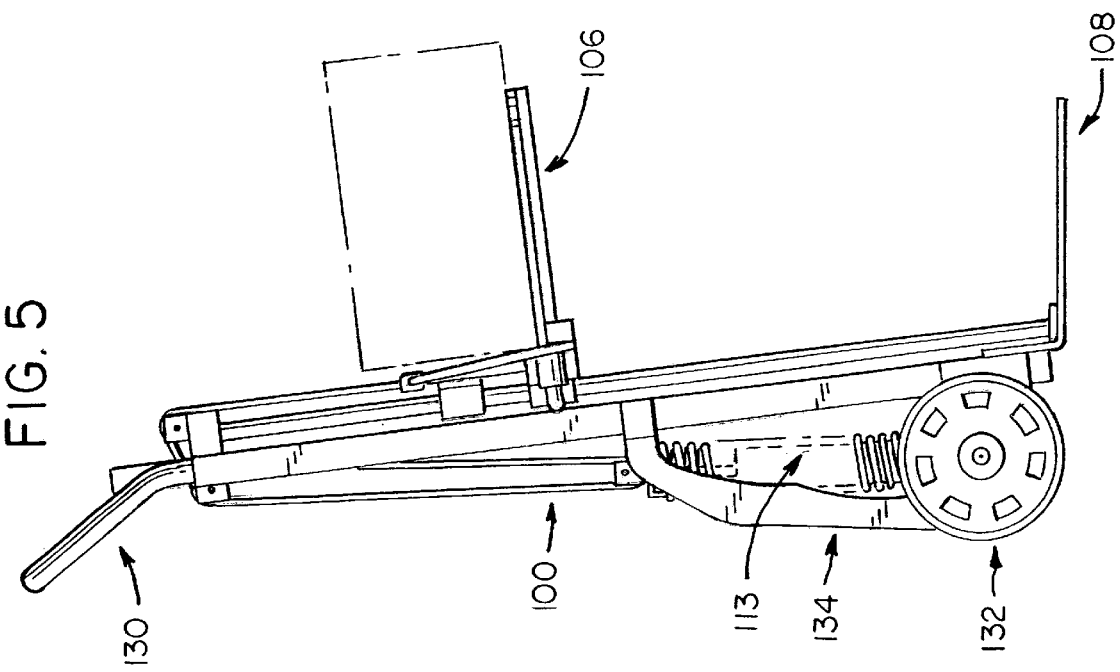
FIG. 5 is an illustration of a side view of the hand truck with the platform loaded with a first item.

Referring to FIG. 2 through FIG. 4, a typical hand truck 100 with a adjustable load platform is illustrated. The typical hand truck 100 is formed from a substantially vertical frame consisting of one or more substantially horizontal support bars 126 spanning between a pair of substantially vertical supports 128. The hand truck usually includes a handle 130 connected to the vertical frame along the top portion to provide a convenient position for a user to grasp the hand truck. A toe platform 108 usually extends from, and is considered part of the lower portion of hand truck 100. Toe platform 108 consists of a plate, typically rectangular in dimension that extends outward from the hand truck 100 substantially horizontally, and as close to the ground surface as possible. With the garden variety of hand truck, a user would place articles to be transported upon toe platform 108. In addition to providing a shelf to place articles, the toe platform 108 provides a convenient way to balance the hand truck 100 while in a stationary position. The present invention however, includes a load platform or load platform assembly 103 that traverses vertically so that a user need not bend or stoop to load hand truck 100. As can be seen in FIG. 5 and FIG. 6, the load platform assembly 103 is capable of suspending articles in a raised position. Depending upon the intended load for the hand truck 100, it may be desirable to adjust toe plate 108 such that the hand truck 100 maintains balance equally well while loaded and unloaded. Whereas toe plate 108 is typically perpendicular to the frame of hand truck 100, adjusting the angle may be necessary. Adjusting the toe plate by 5 to 10 degrees may better balance the hand truck when loaded, while still maintaining a good balance unloaded, however this is dependant upon the desired load. Additionally, wheels 132 are included, usually secured to an axle extending horizontally through the frame near ground level. Finally, while not required, support bars 134, often referred to as "stair climbers" are optionally included on the back side of the frame. Support bars 134 provide a support member to aid in navigating stepped surfaces such as stair steps and the like.

Figure 1:
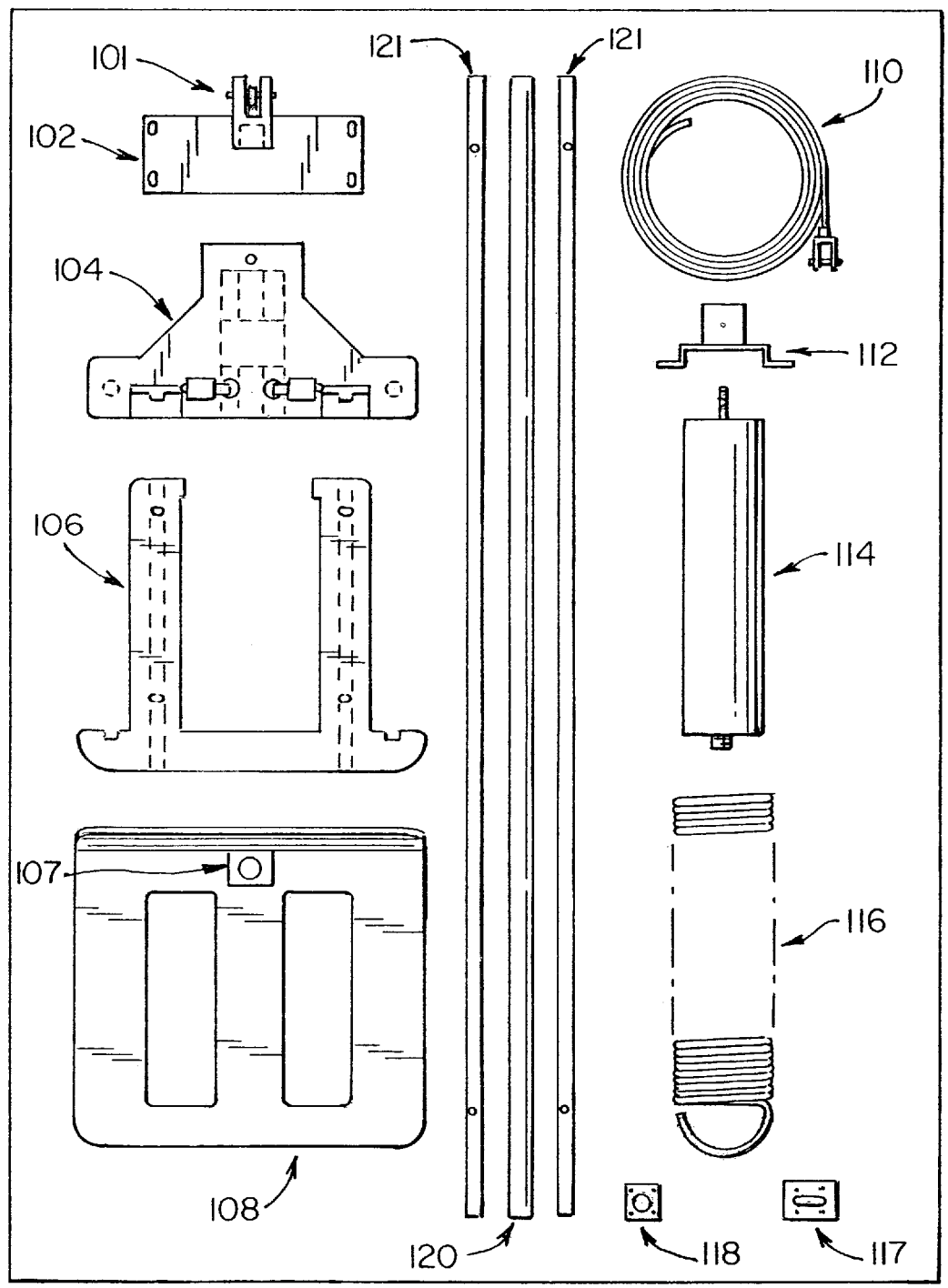
FIG. 1 is an illustration of key component parts laid out for clarity and includes the components comprising the hand truck kit.

The load platform assembly 103 engages the hand truck 100 so as to be freely 10slidable. It can be seen that the load platform assembly 103 could be assembled so as to slide up and down a pair of vertically spaced bars, for example the vertical frame bars of hand truck 100. However, if the load is not evenly distributed, the load platform assembly 103 may bind on one side making the load unstable. To avoid this occurrence, the load platform assembly 103 traverses along a single shaft 120. Shaft 120 is positioned approximately midway between the substantially vertical support bars 128. Support bars 128 form the frame of hand truck 100. Shaft 120 is secured at its lower end to the lower portion of the frame of hand truck 100. For example, shaft 120 can secure directly to toe platform 108 using any suitable connection including welding, bracketing, screwing or bolting. An example of a suitable bracket would include toe bracket 107 as illustrated in FIG. 1 mounted to toe plate 108. Toe bracket 107 includes a bore extending therethrough for receiving the lower end of shaft 120. Toe bracket 107 is secured to toe plate 108 using any suitable means including bolting, screwing or welding. Shaft 120 is secured at its top end using top bracket assembly 102 and can be secured using means similar to those used to secure the bottom of the shaft. The length of shaft 120 is chosen to provide the desired range of travel of the load platform assembly 103. A typical dimension for the shaft 120 would be around 39½ inches, but any length can be chosen. Further, the circumference of the shaft 120 and the material of construction thereof, can vary depending on the weight requirements of a particular application. Preferably, for light to medium duty applications involving loads of up to 200 pounds, the shaft 120 should be a ¾ inch to ⅝ inch hardened steel bar. One factor to consider when selecting the material for shaft 120 is the weight of the load. If the load is excessive for the shaft 120, it is possible for deflection of the shaft 120 to occur. Deflection should be kept as minimal as possible. While the load platform assembly 103 of the present invention avoids binding and the like due to shaft 120 deflection, excessive deflection of shaft 120 could lead to early wear.

Figure 8:
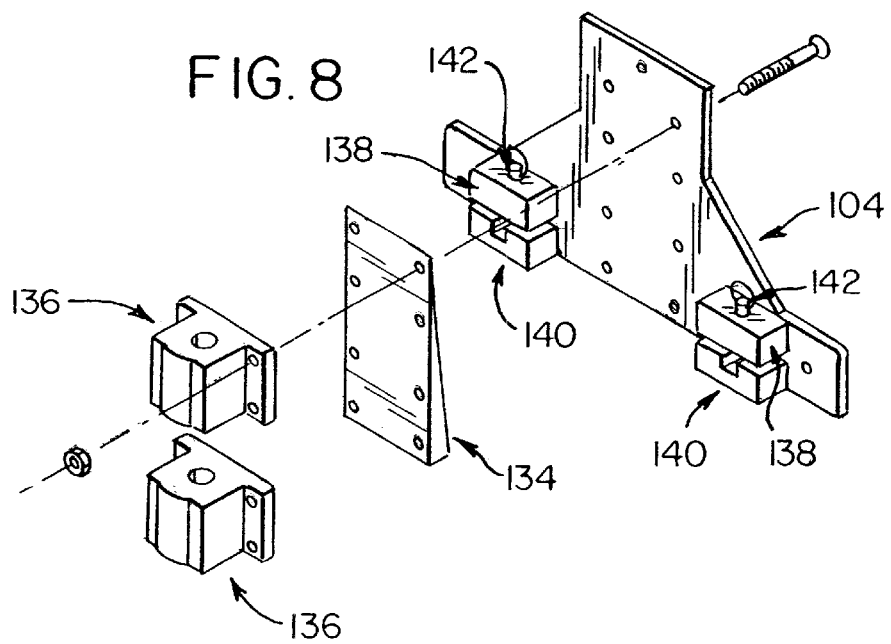
FIG. 8 is an illustration of the shelf plate assembly.

The load platform assembly 103 traverses along shaft 120 according to the load placed upon the hand truck 100. Referring to FIG. 8, an example of a suitable method for connecting the load platform assembly 103 to shaft 120 is illustrated. The load platform assembly 103 consists of a shelf plate 104 which engages bar 120 using linear pillow block bearings 136. Linear pillow block bearings 136 slip over shaft 120 prior to securing either end of shaft 120 to hand truck 100. Preferably, two linear pillow block bearings 136 are bolted onto shelf plate 104 vertically bisecting shelf plate 104 and spaced apart such that a first linear pillow block bearing 136 is positioned near the top, center of shelf plate 104, while a second linear pillow block bearing 136 is positioned near the bottom center of shelf plate 104. Optionally, pillow block mount adaptor 134 can be inserted between shelf plate 104 and linear pillow block bearings 136. Pillow block mount adaptor 134 is used to adjust the tilt of the platform or shelf 106 relative to bar 120. The angle of the pillow block mount adaptor 134 can be adjusted to any suitable angle depending upon the intended load. A typical example would be in the range of 3 to 6 degrees. An example of a suitable assembly would include dowel pinning linear pillow block bearings 136 to pillow block mount adaptor 134 which in turn is bolted to shelf plate 104.

Preferably, platform 106 is separable from the hand truck 100. It is further preferable to allow the platform 106 to be adjustable such that it can be extended or retracted to meet various user requirements. An acceptable approach is to allow the platform 106 to slide substantially horizontally through shelf plate 104. The platform 106 retracts by sliding it in through the shelf plate 104 such that only the front portion extends outward. The forked portion of platform 106 extends through the back of the hand truck 100. This is useful for example when a user wants to stow the hand truck 100.

Shelf plate 104 contains a pair of T-shaped slots positioned to receive the forked end of the shelf or platform 106. The slots are dimensioned to allow the forks of platform 106 to reciprocate through the slots smoothly. Rectangular torquing blocks 138 are bolted to the back side of shelf plate 104 directly above the slots such that the upper horizontal slot edge is adjacent to the lower horizontal edge of a rectangular torquing block 138. Platform guiding blocks 140 are connected to shelf plate 104 directly below the slots on both the front side and the back side of shelf plate 104 such that the lower horizontal slot edge is adjacent to the upper horizontal edge of platform guiding blocks 140. The Platform guiding blocks 140 are a substantially rectangular block notched in the upper portion forming a trough extending therethrough and aligned with the shelf plate 104 such that the trough portion of platform guiding blocks 140 aligns with the lower T portion of the T-shaped slots of shelf plate 104.

Figure 9:
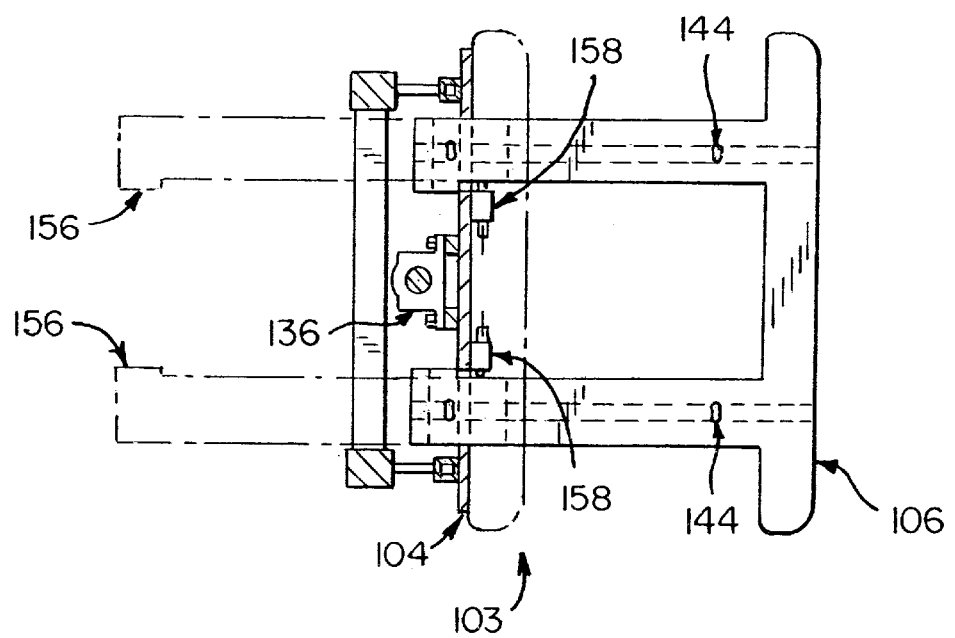
FIG. 9 is an illustration of the load platform from a top view, the dashed lines indicating various positions of the platform engaged with the shelf plate.

Referring to FIG. 9, the platform 106 contains two T-shaped forked portions positioned to engage the slots of shelf plate 104. The T-shape of the forks in platform 106 allow it to reciprocate through the complementary T-shaped slots provided in shelf plate 104. Platform 106 is secured to shelf plate 104 by inserting the platform 106 into the T-shaped slotted portion of shelf plate 104 such that the forks of platform 106 protrude from the back of shelf plate 104. Optional spring clips 142 provide pressure against the forked portion of platform 106 to reduce platform vibration during transportation and the like. Spring clips 142 also assist in maintaining the shelf in a retracted position. As can be seen in FIG. 9, divots 144 are placed along the forked portion of platform 106 for receiving spring clips 142. By pulling or pushing the platform 106 through shelf plate 104 until the spring pins 142 click into the desired divots 144, vibration between the platform 106 and shelf plate 104 is eliminated, or at least greatly reduced. Further, pin blocks 158 are provided on the front portion of shelf plate 104 positioned adjacent to, and to the inside of the slots. Pin blocks 158 serve to maintain the platform 106 engaged with the shelf plate 104 and include a spring biased pin which provides interference with the flanged corners 156 of the previously inserted platform 106. In operation, the pin portion of pin blocks 158 are retracted and platform 106 is slipped through the slots in shelf plate 104. When the pins of pin blocks 158 are retracted, sufficient clearance exists for the flanged portion 156 of the platform 106 to slip through the slots of the shelf plate 104. Once the platform 106 is inserted, the pins of pin blocks 158 are released. This approach allows platform 106 to be completely removable from the hand truck 100, or adjustable between a fully extended and fully retracted position. A rubber bumper may optionally be glued to the front outer edge of platform 106.

Top bracket assembly 102 is formed of a support plate that extends horizontally between vertical support bars 128. The top bracket assembly 102 is positioned preferably near the top of the frame of hand truck 100 to provide maximum travel for platform 106. However, the exact positioning of the top bracket assembly 102 can be adjusted depending upon the size of the shaft 120 selected. The top bracket assembly 102 will preferably contain a pulley assembly 101. The pulley assembly includes at least one pulley for transitioning the cable around the upper portion of hand truck 100. While FIG. 2 illustrates two pulleys extending over the top of bracket assembly 102, it is possible to use a single pulley. Referring to FIGS. 4–5, a bracket (not shown) allows the cable to extend from the shelf plate 104 behind shaft 120. By running the cable behind the shaft 120, a single pulley can be used. Further, an optional shroud (not shown) is placed over the pulley assembly 101 to guard potential pinch points. The pulley assembly 101 will be positioned preferably along the top portion of bracket assembly 102, but can be equally positioned along the bottom portion (not shown).

As is illustrated in the FIGS. 2–6, the platform 106 slides along shaft 120 in response to articles being placed thereon. Depending upon the arrangement of the platform 106, it may be possible for the load to become positioned away from the frame of the hand truck 100. Therefore, optional guide bars 121 can be positioned on either side of shaft 120. An example of a suitable positioning, guide bars 121 can be secured to the top bracket assembly 102 on either side of the shaft, and secured to the lower portion of the frame, the toe plate for example, in a manner similar to that of shaft 120. The intended purpose of guide bars 121 is to provide a place for articles to rest while loaded upon the platform. Depending upon intended use, the bars may be positioned parallel to the shaft 120, or alternatively be positioned skewed with respect to shaft 120. For example, guide bars 121 could be positioned closer at their top portion, than at the bottom portion such that the horizontal distance between the guides 121 increases closer to the lower portion of frame 121. Likewise, the guide bars could be positioned closer together at the bottom portion of the hand truck 100, with the horizontal distance between the guide posts 121 increasing closer to the top of the hand truck 100. Also, guide bars 121 need not be of the same length or construction as the shaft 120.

A platform arrestor 113 is connected to the back portion of hand truck 100 and serves as the lifting mechanism to automatically adjust the position of load platform assembly 103 in response to a load being placed thereon. The platform arrestor 113 holds the load platform assembly 103 suspended in the raised vertical position under no load conditions. The platform arrestor 113 is preferably enclosed in a shroud, but it is not necessary. One example of a suitable platform arrestor would include a spring 116. Referring to FIG. 5 and FIG. 6, the spring 116 could connect to the load platform assembly 103 using a cable. Under no load conditions, the spring 116 would be in an unstretched state, holding the load platform assembly 103 in a raised, vertical position. As articles are loaded upon the load platform, the spring 116 would stretch as the load platform assembly 103 lowered due to the weight of the item placed thereon. Preferably, the vertical distance that the load platform assembly 103 drops would be set proportional to the weight of the load. The top of the first article is now approximately at the same position as the platform 106, prior to loading the first article. As the second article is loaded, the platform 106 again lowers in response to the weight of the article loaded and the spring 116 again stretches. When the second article is removed, the spring 116 responds to the reduction in weight upon the load platform assembly 103 by pulling the load platform assembly 103 upwards. However, should the articles loaded upon the platform 106 become unstable either by tipping or the like, the sudden reduction in weight could cause the spring 116 to react too quickly thus a braking mechanism is preferably included. An example of a suitable brake is a hydraulic cylinder 114. The hydraulic cylinder 114 is positioned such that it works in cooperation with the spring 116 to regulate the response time of the spring 116 to changes in load conditions. The brake 114 should be selected such that a sudden change in the weight placed upon platform 106 will not cause overwhelming oscillations or high velocity transients in the platform 106 position.

An example of a suitable platform arrestor arrangement would include a spring 116 connected to the lower back portion of the hand truck 100. This can be accomplished in a variety of ways, including attachment to the axle of hand truck 100 utilizing cross bracket 117 and bracket 118 as illustrated in FIG. 4. A brake 114 comprised of a hydraulic cylinder 114 is positioned inside spring 116 and attaches to bracket 118 at its lower end. The upper end of brake 114 connects to the upper end of spring 116 and arrestor pulley 112. For example, a telescopic or two stage hydraulic cylinder, a single stage hydraulic cylinder or the like can be used. Additionally, any combination of spring 116 and brake 114 can be used. For example, the brake 114 can be placed inside spring 116. This arrangement provides the further advantage that, should the spring break or otherwise become damaged, the spring will be held to the hand truck 100 via the cylinder 114, and will not fly out. Platform arrestor 113 can optionally provide a brake and a plurality of springs releasably connected to the arrestor pulley 112 to provide a mechanism that can be adjusted according to the weight of the load. As illustrated in FIG. 7, a first spring 152 is placed inside a second spring 154. The upper portion of the second spring 154 is secured to the arrestor pulley 112. The upper portion of the first spring 152 is suspended within the second spring 154. An engagement lever 150 is included on the arrestor pulley 112 for selecting whether to engage the first spring 152, while the second spring 154 is always connected. The engagement lever 150 includes an arm 151 for releasably engaging the upper portion of first spring 152. If both springs 152 and 154 are engaged, the hand truck 100 is equipped for full weight load conditions, while switching out the first spring 152 out can provide for 72 weight load conditions.

Cable 110 forms the linkage between load platform assembly 103 and platform arrestor 113. An example of an acceptable connection would include fastening cable 110 to shelf plate 104. The cable 110 extending upward crossing over top bracket assembly 102 and through top pulley assembly 101, dropping down and through arrestor pulley 112, then extending vertically upward terminating in a connection to the top bracket assembly 102.

The Hand Truck Kit

The components as described above are also suitable to be delivered in the form of a kit to a host hand truck such as those produced by Magliner. A layout of kit parts are illustrated in FIG. 1. While the kit is adaptable to virtually all makes of hand truck, it will be described with respect to parts for installation onto an existing Magliner hand Truck. It should be understood that the kit is easily adaptable to virtually any hand truck. The kit of components bolts onto a host hand truck using approximately 8 bolts. The kit optionally includes a new toe plate 108 with the mounting bracket 107 pre-installed. Optionally, a user can attach bracket 107 to an existing toe plate using any suitable means. The provided toe plate 108 includes a bend such that the toe plate 108 is angled slightly greater that 90 degrees with respect to the vertical frame 100 to assist in balancing the hand truck while items are loaded and the platform is in a raised position as illustrated in FIGS. 4–5. The shaft 120 slips into the bracket 107.

Shelf plate 104 comes pre-assembled as described above and includes a pair of linear pillow block bearings 136. Two linear pillow block bearings 136 are bolted through pillow block mount adaptor 134 and onto shelf plate 104 vertically bisecting shelf plate 104 and spaced apart such that a first linear pillow block bearing 136 is positioned near the top, center of shelf plate 104, while a second linear pillow block bearing 136 is positioned near the bottom center of shelf plate 104. Shelf plate 104 contains a pair of T-shaped slots positioned to receive the forked end of shelf or platform 106. Rectangular torquing blocks 138 are bolted to the back side of shelf plate 104 directly above the slots such that the upper horizontal slot edge is adjacent to the lower horizontal edge of a rectangular torquing block 138. Platform guiding blocks 140 are connected to shelf plate 104 directly below the slots on both the front side and the back side of shelf plate 104 such that the lower horizontal slot edge is adjacent to the upper horizontal edge of platform guiding blocks 140, and pin blocks 158 are provided adjacent to, and to the inside of the slots of the shelf plate 104. The linear pillow block bearings 136 are slipped over the shaft 120, then the top mounting bracket 102 is installed.

The top mounting bracket 102 is installed by removing the four bolts used to secure the handle to the vertical frame members 128. The top mounting bracket is slipped between the vertical bars 128, and before re-installing the shaft 120 is slipped into its mounting bracket. The bolts originally holding the handle are replaced and the top mounting bracket is tightened into place. The top mounting bracket pulley assembly 101 is pre-installed.

Next, the spring 116 is slipped over the axle of hand truck 100. The hooked portion of the spring 116 is slipped through the opening in cross member mounting bracket 117. Mounting bracket 118 is placed on the top portion of the axle, while cross member mounting bracket 117 is placed on the underside of the axle, and the brackets are bolted together. Cylinder brake 114 is slid through the spring 116 and threaded into the bracket 118. The top portion of the brake 114 threads into the bottom portion of arrestor pulley 112. The flanges of the arrestor pulley feed through the coils in the spring 116, and are bent upwards. Cable 110 is secured to the top portion of shelf plate 104, is fed upwards across top mounting bracket pulley assembly 101, downward and through arrestor pulley 112, upward and finally connecting to the top mounting bracket 102. Shelf guide bars 121 are then installed between the top mounting bracket 102 and the toe plate 108. Finally, the forked portion of platform 106 is pushed through the slots provided in the shelf plate 104 until the spring pins 142 click into the desired divots 144.

Having described the invention in detail and by reference to preferred embodiments thereof, it will be apparent that modifications and variations are possible without departing from the scope of the invention defined in the appended claims.

What is claimed is:

1. A kit of components for adding an adjustable load platform to a host hand truck, the host hand truck having in its original configuration, a substantially vertical frame having spaced parallel bars; a frame upper portion; and a frame lower portion, said frame lower portion including a toe platform extending substantially outward from said frame; at least one set of wheels connected to said frame lower portion opposite said toe platform; and where said kit of components comprises:

a shelf guide having a shelf guide upper portion and a shelf guide lower portion, said shelf guide upper portion secured to said frame upper portion and said shelf guide lower portion secured to said frame lower portion;

a load platform slidably mounted to said shelf guide;

at least one spring coupled between said frame lower portion and said load platform, said at least one spring biased such that said load platform is held in a raised position under no load conditions, and said load platform lowers due to the weight of a load placed thereon; and, at least one spring brake coupled between said frame lower portion and said load platform generally in parallel with said at least one spring, said at least one spring brake arranged to control the rate at which said load platform transitions upward in response to both load and no load conditions.

2. A kit of components for adding an adjustable load platform to a host hand truck according to claim 1, further comprising a pulley secured to said frame upper portion, wherein said at least one spring and said at least one spring brake are coupled to said load platform by a cable extending around said pulley.

3. A kit of components for adding an adjustable load platform to a host hand truck according to claim 1, wherein said shelf guide further comprises:

a top mounting bracket secured to said frame upper portion between said spaced parallel bars;

at least one bracket pulley attached to said top mounting bracket; and a single shaft positioned between said top mounting bracket and said frame lower portion, said load platform slidably mounted thereon.

4. A kit of components for adding an adjustable load platform to a host hand truck according to claim 3, wherein said shelf guide further comprises a pair of stabilizing bars connected between said frame upper portion and said frame lower portion, said pair of stabilizing bars placed one on either side of said shaft.

5. A kit of components for adding an adjustable load platform to a host hand truck according to claim 3, wherein said load platform further comprises a shelf plate slidably mounted to said shaft and a platform releasably securable to said shelf plate.

6. A kit of components for adding an adjustable load platform to a host hand truck according to claim 5, wherein:

a said load platform includes a forked portion;

said shelf plate includes a slotted portion positioned to receive said forked portion of said load platform;

said platform is attachable to said shelf plate by sliding said forked portion of said platform through said slotted portion of said shelf plate; and said shelf plate includes a locking device to secure said platform to said shelf plate in at least one position.

7. A kit of components for adding an adjustable load platform to a host hand truck according to claim 1, wherein said at least one spring further comprises:

a first spring coupled between said frame lower portion and said load platform; and;

at least one spring removably attached between said frame lower portion and said load platform.

8. A kit of components for adding an adjustable load platform to a host hand truck according to claim 1, wherein said at least one spring brake comprises at least one hydraulic cylinder.

9. A kit of components for adding an adjustable load platform to a host hand truck according to claim 1, further comprising:

a pulley secured to said frame upper portion;

a cable connected between said load platform and said at least one spring, said cable extending around said pulley; and wherein:

said shelf guide further comprises;

a top mounting bracket secured to said frame upper portion between said spaced parallel bars;

at least one bracket pulley attached to said top mounting bracket; and a single shaft positioned between said top mounting bracket and said frame lower portion, said load platform slidably mounted thereon.

10. A kit of components for adding an adjustable load platform to a host hand truck according to claim 9, wherein said load platform further comprises a shelf plate slidably mounted to said shaft and a platform releasably securable to said shelf plate, said platform having a forked portion and said shelf plate having a slotted portion positioned to receive said forked portion of said platform, wherein said platform is attachable to said shelf plate by sliding said forked portion of said platform through said slotted portion of said shelf plate.

11. A hand truck comprising:

a substantially vertical frame having spaced parallel bars, a frame upper portion, and a frame lower portion;

a toe platform extending substantially outward from said frame lower portion;

at least one set of wheels connected to said frame lower portion;

a shelf guide having a shelf guide upper portion and a shelf guide lower portion, said shelf guide upper portion secured to said frame upper portion and said shelf guide lower portion secured to said frame lower portion;

a load platform slidably mounted to said shelf guide;

at least one spring coupled between said frame lower portion and said load platform, said at least one spring biased such that said load platform is held in a raised position under no load conditions, and said load platform drops due to the weight of a load placed thereon; and, at least one spring brake coupled between said frame lower portion and said load platform generally in parallel with said at least one spring, said at least one spring brake arranged to control the rate at which said load platform transitions upward in response to both load and no load conditions.

12. A hand truck according to claim 11, further comprising a pulley secured to said frame upper portion, wherein said at least one spring and said at least one spring brake are coupled to said load platform by a cable extending around said pulley.

13. A hand truck according to claim 11, wherein said shelf guide further comprises:

a top mounting bracket secured to said frame upper portion between said spaced parallel bars;

at least one bracket pulley attached to said top mounting bracket; and a single shaft positioned between said top mounting bracket and said frame lower portion, said load platform slidably mounted thereon.

14. A hand truck according to claim 13, wherein said shelf guide further comprises a pair of stabilizing bars connected between said frame upper portion and said frame lower portion, said pair of stabilizing bars placed one on either side of said shaft.

15. A hand truck according to claim 13, wherein said load platform further comprises a shelf plate slidably mounted to said shaft and a platform releasably securable to said shelf plate.

16. A hand truck according to claim 15, wherein:

said load platform includes a forked portion;

said shelf plate includes a slotted portion positioned to receive said forked portion of said load platform;

said platform is attachable to said shelf plate by sliding said forked portion of said platform through said slotted portion of said shelf plate; and said shelf plate includes a locking device to secure said platform to said shelf plate in at least one position.

17. A hand truck according to claim 11, wherein said at least one spring further comprises:

a first spring coupled between said frame lower portion and said load platform; and;

at least one spring removably attached between said frame lower portion and said load platform.

18. A hand truck according to claim 11, wherein said at least one spring brake comprises at least one hydraulic cylinder.

19. A hand truck comprising:

a substantially vertical frame having spaced parallel bars, a frame upper portion, and a frame lower portion;

a toe platform extending substantially outward from said frame lower portion;

at least one set of wheels connected to said frame lower portion;

a shelf guide having a top mounting bracket secured to said frame upper portion between said spaced parallel bars and a shelf guide lower portion secured to said frame lower portion, at least one bracket pulley attached to said top mounting bracket;

a single shaft positioned between said top mounting bracket and said frame lower portion, between said spaced parallel bars;

a load platform glidably mounted to said shaft;

at least one spring coupled between said frame lower portion and said load platform, said at least one spring biased such that said load platform is held in a raised position under no load conditions, and said load platform is arranged to lower due to the weight of a load placed thereon; and, at least one spring brake coupled between said frame lower portion and said load platform generally in parallel with said at least one spring, said at least one spring brake arranged to control the rate at which said load platform transitions upward in response to both load and no load conditions.

20. A hand truck according to claim 19, wherein said load platform further comprises a shelf plate slidably mounted to said shaft and a platform releasably securable to said shelf plate, said platform having a forked portion and said shelf plate having a slotted portion positioned to receive said forked portion of said platform, wherein said platform is attachable to said shelf plate by sliding said forked portion of said platform through said slotted portion of said shelf plate.

* * * * *

UNITED STATES PATENT AND TRADEMARK OFFICE
CERTIFICATE OF CORRECTION

PATENT NO. : 6,457,727 B1
DATED : October 1, 2002
INVENTOR(S) : Randal Lee Tolly It is certified that error appears in the above-identified patent and that said Letters Patent is hereby corrected as shown below:

Column 1,
Line 33, "reference to; the" should read -- reference to the --

Column 4,
Line 43, "freely 10slidable." should read -- freely slidable. --

Column 8,
Line 11, "72 weight" should read -- ½ weight --

Column 10,
Line 45, "comprises;" should read -- comprises: --

Column 12,
Line 29, "platform glidably" should read -- platform slidably --

Signed and Sealed this

Twentieth Day of May, 2003

JAMES E. ROGAN
*Director of the United States Patent and Trademark Office*